United States Patent [19]

Kronseder

[11] Patent Number: 5,056,650
[45] Date of Patent: Oct. 15, 1991

[54] VESSEL TREATMENT MACHINE

[76] Inventor: Hermann Kronseder, Regensburger Strasse 42, D-8404 Wörth/Donau, Fed. Rep. of Germany

[21] Appl. No.: 425,171
[22] PCT Filed: Nov. 11, 1988
[86] PCT No.: PCT/EP88/01022
  § 371 Date: Oct. 13, 1989
  § 102(e) Date: Oct. 13, 1989
[87] PCT Pub. No.: WO89/04289
  PCT Pub. Date: May 18, 1989

[30] Foreign Application Priority Data

Nov. 11, 1987 [DE] Fed. Rep. of Germany ... 8715020[U]

[51] Int. Cl.⁵ .............................................. B65G 35/00
[52] U.S. Cl. .................. 198/723; 198/480.1; 198/473.1; 141/177
[58] Field of Search ............... 198/473.1, 479.1, 480.1, 198/723; 141/177

[56] References Cited

U.S. PATENT DOCUMENTS 2,176,557 10/1939 Lippold .
2,827,998 3/1958 Breeback .

FOREIGN PATENT DOCUMENTS

1923260 9/1965 Fed. Rep. of Germany .
3418737 11/1985 Fed. Rep. of Germany .
660700 11/1951 United Kingdom .

Primary Examiner—Joseph E. Valenza
Attorney, Agent, or Firm—Nilles & Nilles

[57] ABSTRACT

A vessel handling machine comprises a machine frame on which is arranged a drivable conveyor start with the star crown (3) consisting of several superimposed external star rings and a concentric internal flange plate (10) located at the level of the lowest star ring. The star crown can be secured to the internal flange plate (10) by an inwardly facing edge (14) and a flange plate is connected to a drive shaft (12). To permit easier and faster replacement of the star crown, the flange plate is rigidly connected to the drive shaft and rapid locking latches (15) which hold the inner edge of the star crown are mounted on the outer edge of the flange plate.

19 Claims, 7 Drawing Sheets

VESSEL TREATMENT MACHINE

BACKGROUND OF THE INVENTION

1. Field of the Invention

The present invention refers to a vessel treatment machine comprising a machine frame and a transport star, which is arranged on said machine frame such that it is adapted to be driven and which includes a star-shaped collar consisting of several outer star-shaped rings, which are arranged one on top of the other, and an inner flange plate, which is concentric with said star-shaped collar and which is located on the level of the lower star-shaped ring, the star-shaped collar being adapted to be secured to said flange plate via an inwardly directed rim and said flange plate being connected to a drive shaft.

2. Description of the Prior Art

Vessel treatment machines provided with transport stars are used e.g. in bottle filling systems. The transport stars have the function of transporting the bottles, which arrive in a single file, to specific treatment stations. For this purpose, the outer circumference of said transport stars is provided with socalled star pockets, which are adapted to the respective bottle diameters. Hence, the transport stars have to be exchanged if other sizes or shapes of bottles are to be treated by the vessel treatment machine. This exchange of the vessel transport stars has been rather complicated up to now. Conventional transport stars are provided with two star-shaped plates spaced from each other by means of a spacer ring. Fastening of the transport star to the drive shaft and the flange plate, respectively, is effected by means of a central screw which is inserted into the transport star from above and tightened on the flange plate. In particular in the case of transport stars of some height, this type of fastening is rather complicated, since it is not easy to find the tapped hole provided in the flange plate. Moreover, these transport stars, which are constructed as solid components, are comparatively heavy and this makes an exchange of said stars more difficult.

In order to reduce the weight of said transport stars, attempts have already been made to produce them from rigid expanded plastics. Although the weight can thus be reduced, the fastening of the transport star is still as complicated as before.

Furthermore, German-Offenlegungsschrift No. 34 18 737 discloses a transport star, which is pushed onto a cylindrical column and which is pressed downwards onto a support ring, said pressure being applied from above by means of an annular rotational body. For the purpose of exchanging the transport star, it is first of all necessary to remove the rotational body and then the transport star has to be taken off along the column. This method, too, is complicated.

U.S. Pat. No. 2,176,557 discloses a transport star consisting of a star-shaped plate which is positioned on a flange plate. The flange plate is provided with three upwardly directed pins engaging holes of the star-shaped plate. If the direction of transport of the transport star is to be reversed, the star-shaped plate can be removed upwards and reattached to the pins after having been rotated by 180°. A possibility of fastening the star-shaped plate to the flange plate is not provided.

U.S. Pat. No. 2,827,998 shows a transport star which is screwed on a flange of a hollow shaft. For the purpose of removing the transport star, it is first of all necessary to screw said transport star off said flange. The drive shaft must then be disassembled so that the transport star can be removed from the machine. In this case, too, the removal of the transport star is very complicated.

GB-pat. No. 660 700 discloses a vessel treatment machine of the type mentioned at the beginning in the case of which a flange plate is pushed onto a drive shaft and secured by means of a central screw. The outer rim of the flange plate has secured thereto the inner rim of a transport star via several screws. Fastening of the transport star together with the flange plate is effected through a central screw, which is screwed into the drive shaft and which, via a cover, presses from above onto the upper outer star-shaped ring of the transport star. Also this transport star entails the problem that, for exchanging the transport star, it is necessary to screw the central screw from above—while the view is obstructed by the cover—into the hole of the drive shaft. In addition to the fact that several time-consuming screwing operations are required, it is not easy to hit the tapped hole in the drive shaft with the screw.

Finally, German Utility Model 19 23 260 discloses a transport star which is screwed onto the drive shaft via a plate arranged in the area of the upper star-shaped ring. It is true that in the case of this transport star the fastening by means of screws is already less difficult than in the case of the preceding transport stars described, but it is more difficult to attach the transport star to the shaft, since the drive shaft has to be passed through an opening in the plate, the view being, however, obstructed by the transport star itself. Hence, in this case, too, the exchange of the transport star is comparatively time-consuming.

SUMMARY OF THE INVENTION

The present invention is therefore based on the task of improving a vessel treatment machine of the type mentioned at the beginning in such a way that the exchange of the star-shaped collar can be carried out easier and faster.

In accordance with the present invention, this task is solved by the features that the flange plate is fixedly connected to the drive shaft and that the outer rim of the flange plate has attached thereto quick-locking bars which hold the inner rim of the star-shaped collar.

This provides the advantage that the star-shaped collar can be placed on the flange plate from above, without the view being obstructed by a cover or the like. For the purpose of fastening the star-shaped collar, it will be sufficient to actuate the quick-locking bars. In addition to easier fastening, the advantage is provided that the star-shaped collar can be constructed such that it weighs less, since it only consists of the star-shaped rings, which are arranged one on top of the other, and since an upper fastening plate can be dispensed with.

It is possible to form the inwardly directed rim of the star-shaped collar on the lower star-shaped ring in an advantageous manner. In cases in which the star-shaped rings are secured to a tubular hub, the inwardly directed rim of the star-shaped collar can also be formed on the hub itself.

In accordance with a first preferred embodiment, the quick-locking bars are constructed as eccentric bars, which extend through the inner rim of the lower star-shaped ring and through the outer rim of the flange plate and in the case of which a bolt engages, from below, behind one of the two rims and an eccentric cam presses, from above, on the other of the two rims, said eccentric cam being pivotably supported on the bolt. This has the effect that the star-shaped collar is clampingly fastened to the outer rim of the flange plate via the inwardly directed rim of its lower star-shaped ring. As is normally the case with eccentric bars, the necessary actuating paths are—other than in the case of screw connections—only very short.

Positioning of the star-shaped collar on the flange plate is facilitated in an advantageous manner on the basis of the feature that a circumferentially extending centering recess is formed in the inner rim of the star-shaped collar on the underside thereof, the outer rim of the flange plate engaging said centering recess.

Simple torque transmission from the flange plate to the star-shaped collar is achieved when the outer rim of the flange plate is provided with radial driving recesses which are engaged by radially inwards directed driving lugs of the star-shaped collar.

The orientation of the star-shaped collar in the direction of rotation of the transport star can be determined clearly when one of the driving lugs and an associated driving recess are larger or smaller than the remaining driving lugs and driving recesses. Fastening of the star-shaped collar to the flange plate is then only possible in one specific rotational position.

It will be advantageous when the star-shaped rings consist of a viscoelastic plastic material. A material which may, for example, be used in this connection is a rigid expanded polyurethane, which shows also sufficient strength in addition to its elastic properties. The star-shaped rings and, consequently, also the star-shaped collar will weigh less so that the star-shaped collars can be exchanged even more easily.

It will be advantageous when each of the star-shaped rings has embedded therein a metallic reinforcing ring.

In accordance with a specially preferred embodiment, the quick-locking bars are constructed as pivotable bars whose outer ends are located radially within the outer rim of the flange plate in the opening position and extend over the inner rim of the star-shaped collar in the closing position. Hence, it can be achieved—by means of simple pivoting of these pivotable bars—that the star-shaped collar can no longer be removed from the flange plate in the closing position. Positive locking of the star-shaped collar on the flange plate is thus achieved in connection with the driving lugs and recesses.

When the pivotable bars are constructed such that, in an intermediate position, the outer ends of said bars press radially against the lower, elastic-yielding star-shaped ring, a sort of toggle catch is obtained, the pivotable bars being secured against unintentional pivoting in both end positions, i.e. in the opening position as well as in the closing position.

A particularly simple and, primarily, simultaneous operation of the individual pivotable bars will be obtained when the individual pivotable bars have their inner ends pivotably articulated on a rotatable disc after the fashion of a crank mechanism, said disc being rotatably supported on the flange plate such that it is concentric therewith, and when said individual pivotable bars are supported in slide guide means between their respective inner ends and outer ends. A rotational displacement of the rotatable disc by a specific angle causes pivoting and, consequently, the radial displacement of the individual pivotable bars. In view of the fact that all pivotable bars are articulated on one common rotatable disc, the star-shaped collar can be locked on the flange plate by one single manipulation.

For determining the angle of rotational displacement, it will be advantageous when the flange plate has provided thereon at least one stop means limiting the angle of rotational displacement of the rotatable disc, said stop means being arranged at the side of the rotatable disc when seen in the radial direction.

A particularly preferred embodiment is an embodiment according to which the stop means are constructed as at least two oppositely disposed cap screws, which are screwed into the flange plate and which extend over the rotatable disc from above. These cap screws produce the effect that the rotatable disc is held on the flange plate and, simultaneously, they fulfil the function of stop means, since the pivotable bars contact said cap screws close to their inner ends, said contact being established by the front edge in the closing position and by the rear edge in the opening position.

The slide guide means for the pivotable bars can be constructed in a particularly simple manner as an elongate hole, which extends in the longitudinal direction, a guide pin, which is inserted in the flange plate, extending through said elongate hole. Such a slide guide means permits longitudinal guiding as well as a pivotal movement of the pivotable bar.

When a handle is attached to the upper side of the rotatable disc such that it is secured against rotation relative thereto, it will be particularly simple to move the pivotable bars from the opening position to the closing position.

Although two quick-locking bars would be sufficient, four quick-locking bars are preferably arranged such that they are uniformly distributed in the circumferential direction of the flange plate.

In order to avoid that possibly existing broken pieces of glass must be removed upon exchanging the star-shaped collars, the flange plate has formed therein openings through which broken pieces of glass can fall.

In accordance with a preferred embodiment, each of said openings extends approximately between two neighbouring pivotable bars and from the outer rim of the flange plate up to the rotatable disc.

In the following, a preferred embodiment of the present invention will be explained in detail on the basis of a drawing, in which:

DESCRIPTION OF THE PREFERRED EMBODIMENT

Figure 1:
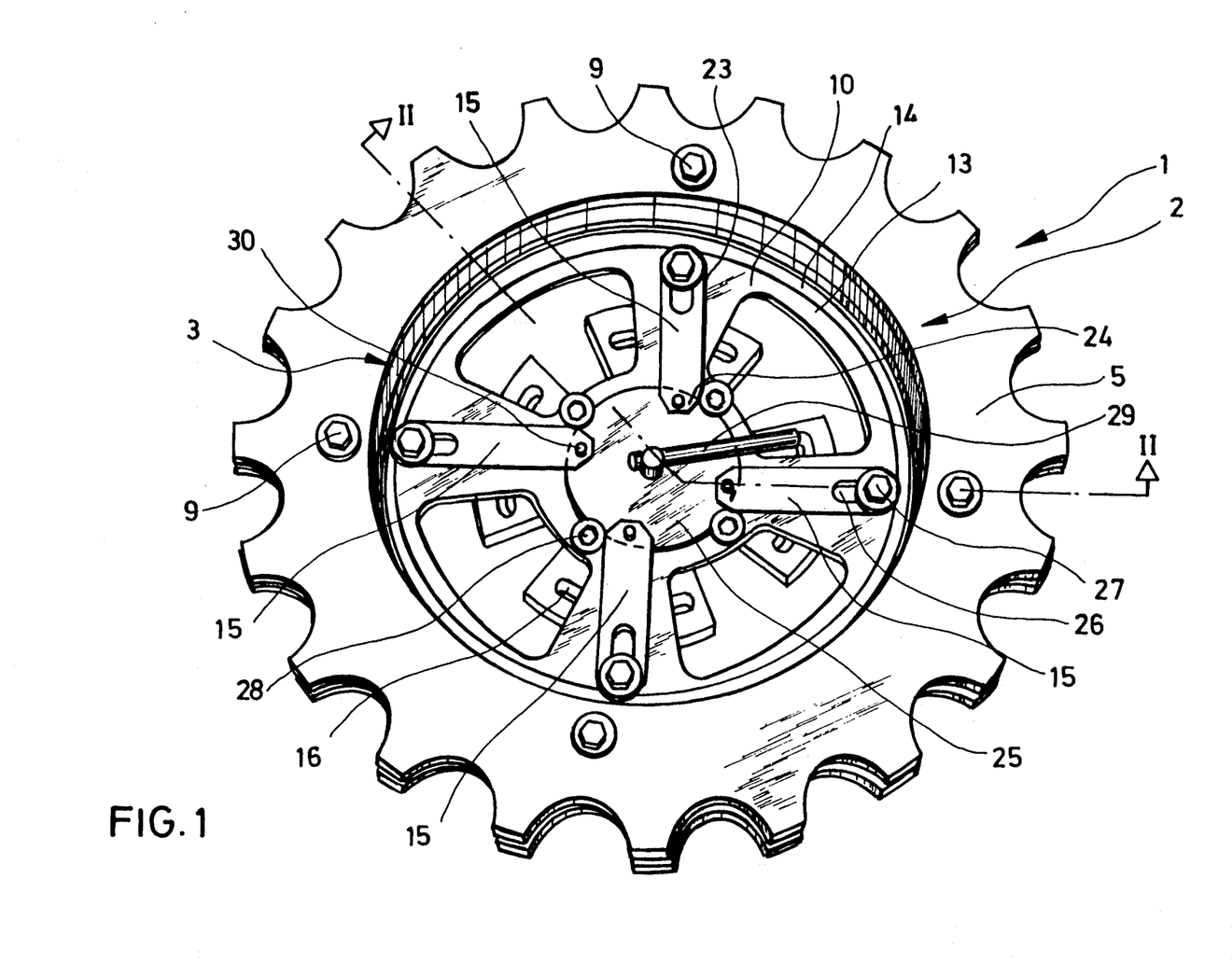
FIG. 1 shows, at an oblique angle, a top view of a first embodiment of a transport star of a vessel treatment machine according to the invention.

FIG. 1 shows a detail of a vessel treatment machine 1 comprising a machine frame, which is not shown, and a transport star 2, which is arranged on said machine frame such that it is adapted to be driven and which is used for separately transporting bottles or similar vessels. In the case of the embodiment shown in this figure, the transport star 2 is provided with a star-shaped collar 3 consisting or two star-shaped rings 5 and 6, which are arranged one above the other and spaced apart by a spacer ring 4. The star-shaped rings 5 and 6 are provided with star pockets 7 on the outer circumference thereof, said star pockets being adapted to the outer circumference of the bottles or cans to be transported. The two star-shaped rings 5 and 6 consist of a viscoelastic plastic material, such as a rigid expanded polyurethane. Each of the star-shaped rings 5 and 6 has embedded therein a metallic reinforcing ring 8. By means of locking screws 9, which extend also through the spacer ring 4, the two star-shaped rings 5 and 6 are screwed together so as to form the star-shaped collar 3.

On the level of the lower star-shaped ring 6, the transport star 2 is provided with an inner flange plate 10, which is arranged concentrically with the star-shaped collar 3 and which is fixedly connected with the drive shaft 12 of the transport star 2 via a flange 11.

Figure 2:
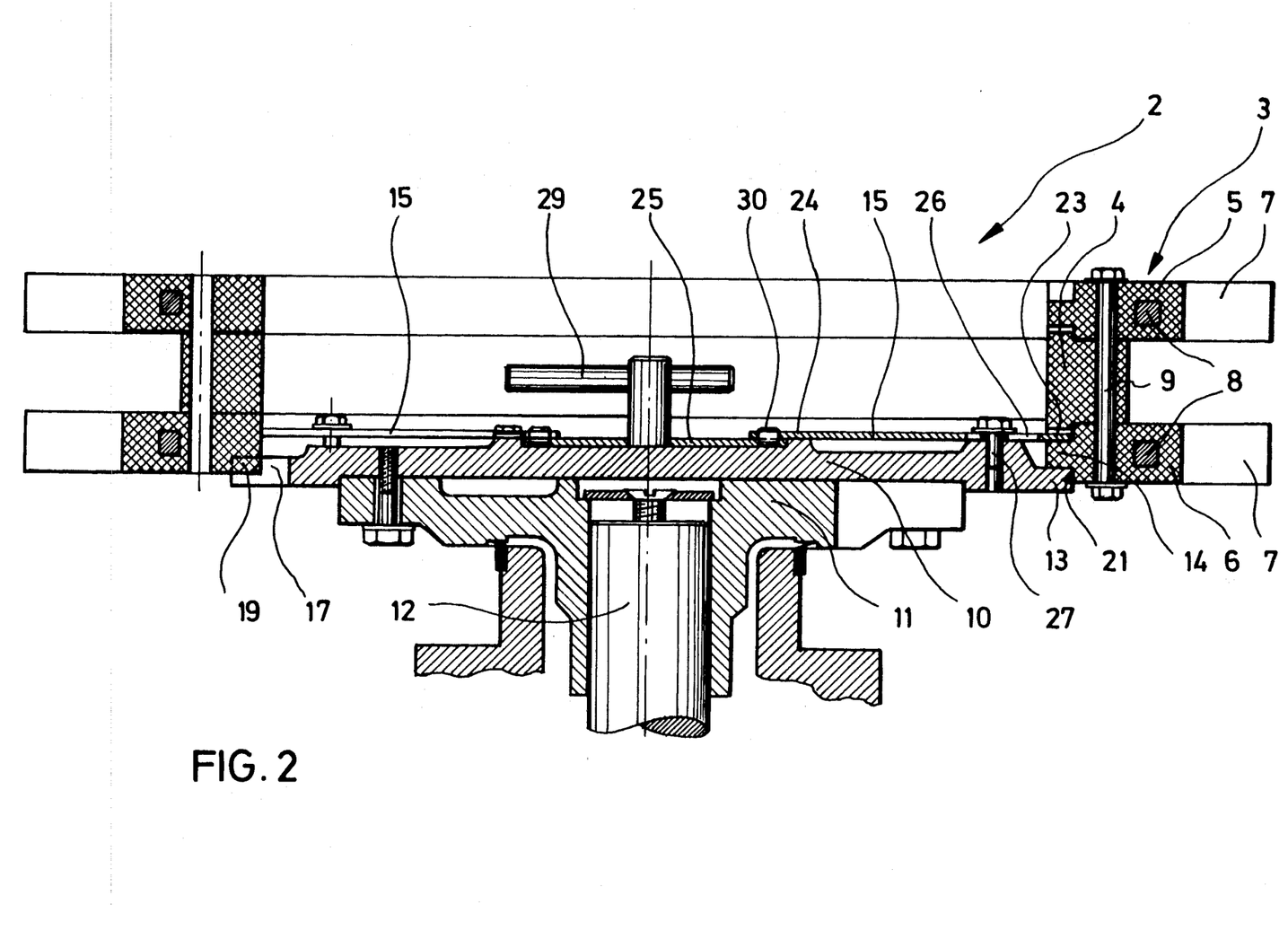
FIG. 2 shows a sectional view through the transport star of FIG. 1 along the line II—II.

As is shown particularly well by FIG. 2, the flange plate 10 is provided with an outwardly stepped outer rim 13 on which the star-shaped collar 3 rests via a radially inwards directed rim 14 of the lower star-shaped ring 6. The dimensions of the outer rim 13 and of the inner rim 14 are selected such that both rims cause centering of the star-shaped collar 3 on the flange plate 10.

The star-shaped collar 3 is fastened by means of quick-locking bars 15 arranged on the outer rim 13 of the flange plate 10 and holding, in their closed position, the inner rim 14 of the lower star-shaped ring 5 of the star-shaped collar 3. The precise structural design of the quick-locking bars 15 will still be explained in detail hereinbelow.

Figure 3:
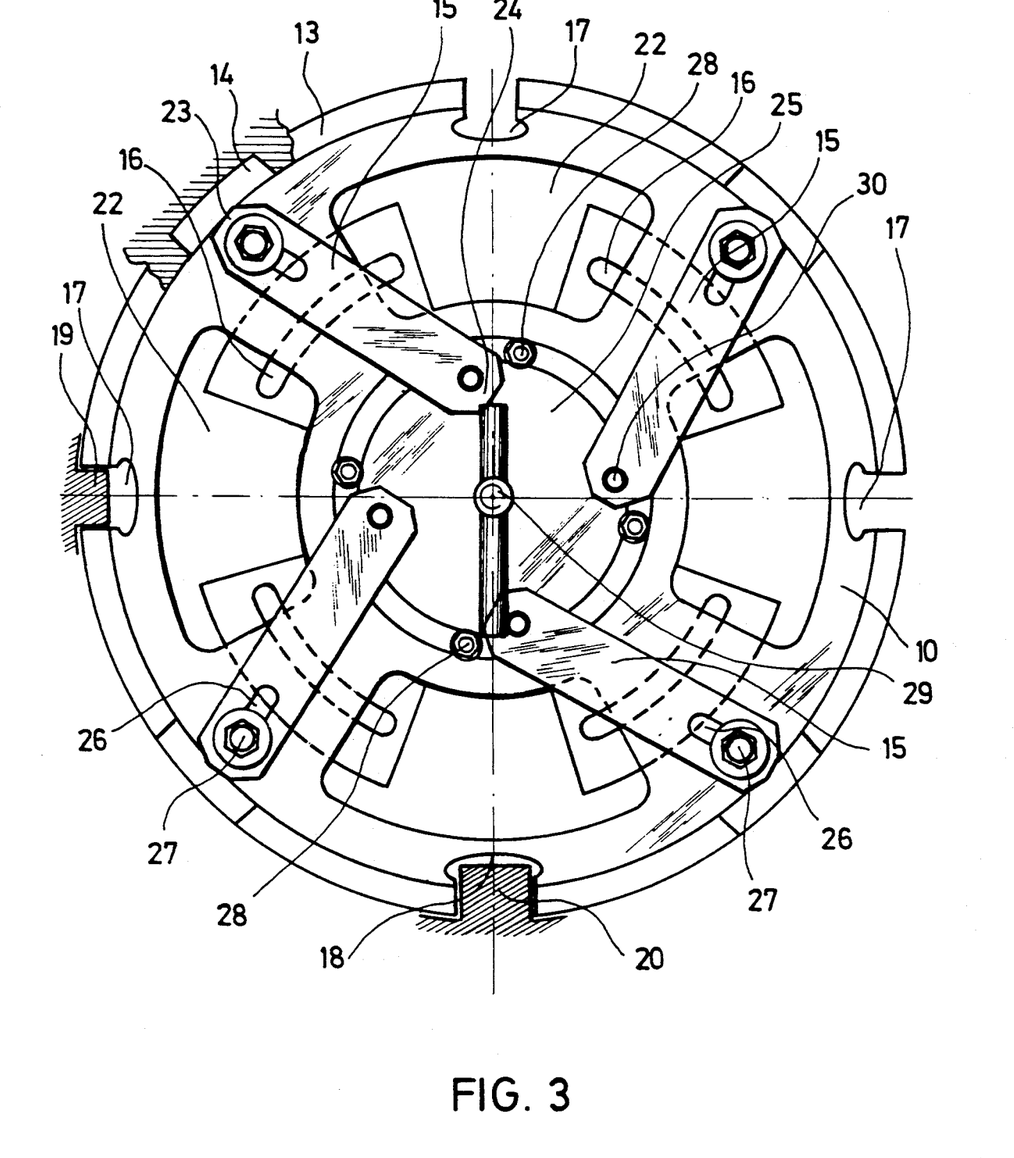
FIG. 3 shows a top view of a flange plate with quick-locking bars of the transport star of FIG. 1 in the opening position.
Figure 4:
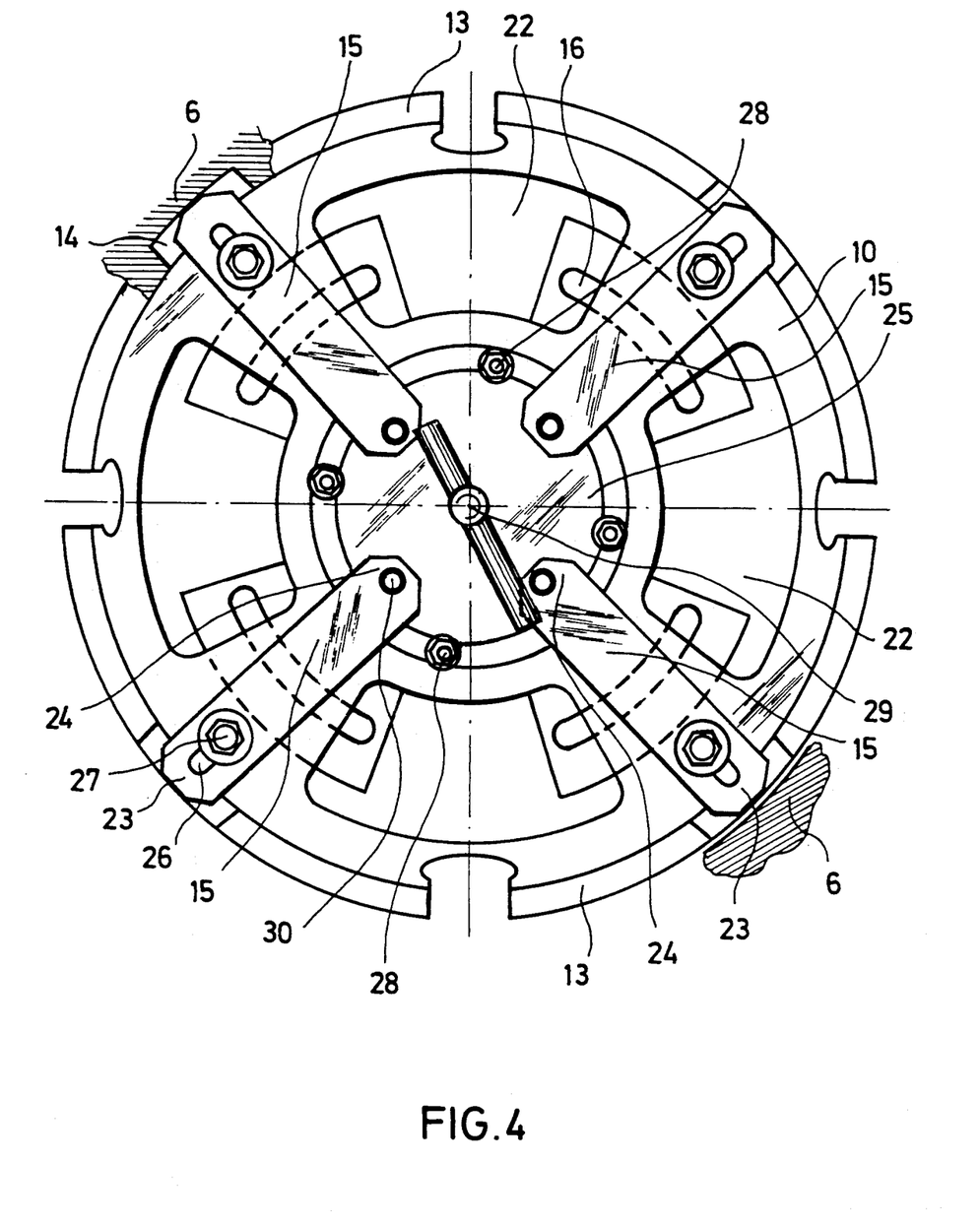
FIG. 4 shows the flange plate of FIG. 3 with the quick-locking bars in an intermediate position.
Figure 5:
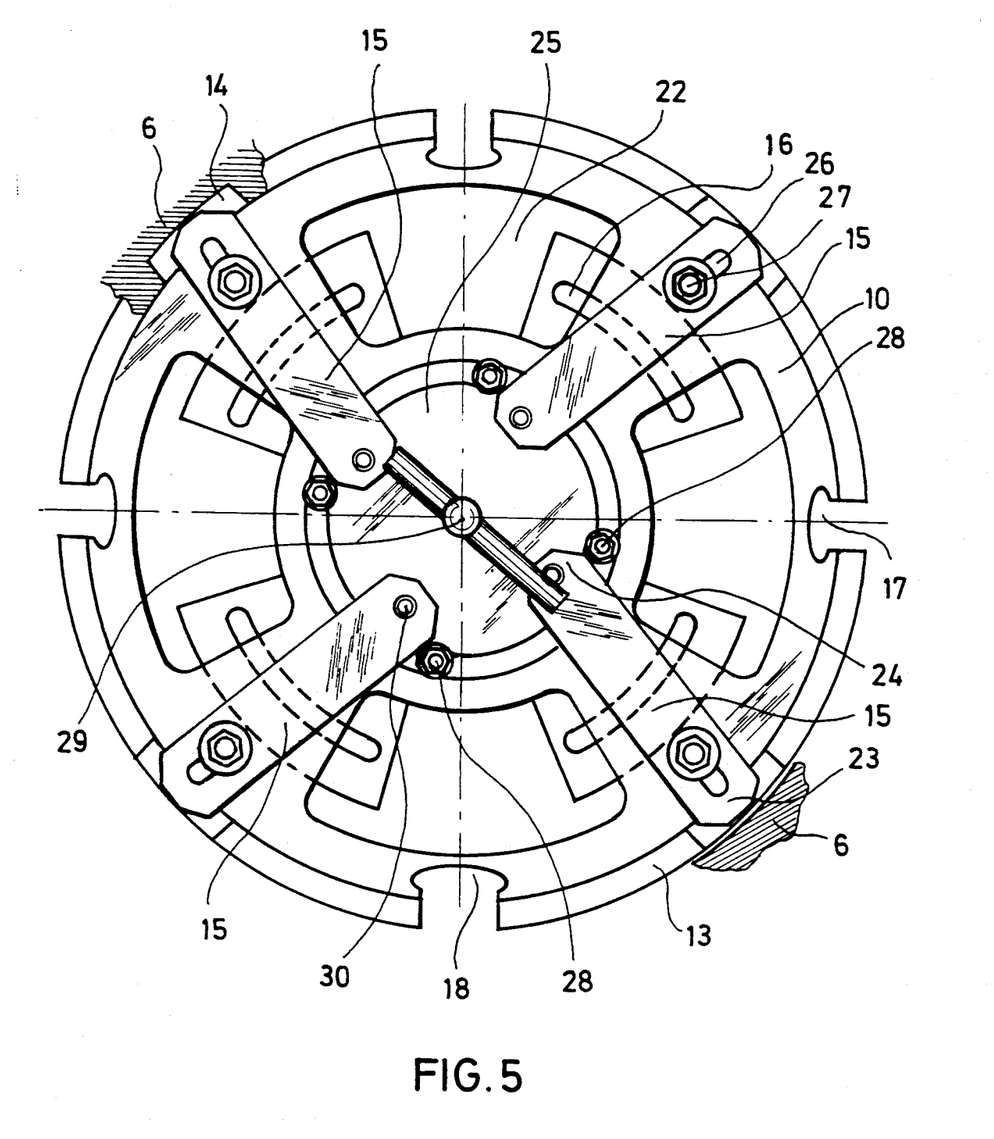
FIG. 5 shows the flange plate of FIG. 3 with the quick-locking bars in the closing position.

As is particularly easily evident from FIGS. 3 to 5, the flange 11 is provided with elongate holes 16, which are oriented circumferentially and through which the fastening screws for the flange plate 10 extend. On the basis of this arrangement, it is possible to rotationally displace the flange plate 10 relative to the flange 11 so as to determine a specific angular position.

The flange plate 10 has on its outer rim 13 radial driving recesses 17 and 18, which are engaged by radially inwards directed driving lugs 19 and 20 of the inner rim 14 of the lower star-shaped ring 6. These driving lugs and recesses are primarily used for the purpose of torque transmission between the flange plate 10 and the star-shaped collar 3. Since, however, the driving recess 18 and the associated driving lug 20 are larger than the remaining driving recesses 17 and driving lugs 19, this type of torque transmission determines at the same time a specific angular relation between the star-shaped collar 3 and the flange plate 10.

In the case of the embodiment shown in these figures, centering between the lower star-shaped ring 5 and the flange plate is effected by a recess 21, which has the shape of an annular groove and which is provided on the underside of the inner rim 14 of the lower star-shaped ring 6.

As is shown particularly well in FIGS. 1, 3, 4 and 5, the flange plate is provided with openings 22 for the disposal of broken pieces. This means that any broken pieces which may perhaps reach the interior of the star-shaped collar 3 can leave said star-shaped collar downwards through the openings 22 without impairing the work sequence of the vessel treatment machine.

In the following, the quick-locking bars 15 of the first embodiment will be explained in detail.

The quick-locking bars 15 of the embodiment shown in the present connection are pivotable bars whose outer ends 23 are located radially within the outer rim 13 of the flange plate 10 in the opening position shown in FIG. 3 and extend, from above, over the inner rim 14 of the lower star-shaped ring 6 in the closing position shown in FIGS. 5 and 1. A total number of four such pivotable bars 15 is provided, said pivotable bars extending essentially radially from the centre of the flange plate 10 to the outer edge thereof.

The inner ends 24 of the individual pivotable bars 15 are pivotably articulated after the fashion of a crank mechanism on pivot studs 30 of a rotatable disc 25, which is rotatably supported on the flange plate 10 such that it is concentric therewith. Between their outer ends 23 and their inner ends 24 the pivotable bars 15 are supported in a slide guide means. This slide guide means consists of an elongate hole 26, which extends in the longitudinal direction of the pivotable bars 15, and of a guide pin 27, which extends through said elongate hole 26 and which is inserted in the flange plate 10.

Cap screws 28 are screwed into the flange plate 10 directly adjacent the rotatable disc 25, when seen in the radial direction. On the one hand, these cap screws hold the rotatable disc 25 on the flange plate 10 and prevent unintentional removal of the same, and, on the other hand, said head screws 28 act as stop means for the pivotable bars 15 in their opening position (cf. FIG. 3) and their closing position (cf. FIG. 5). As far as the stop means function is concerned, one cap screw 28 would be sufficient, since, in the opening position, it comes into contact with the front edge and, in the closing position, it comes into contact with the rear edge of a neighbouring pivotable bar 15.

The cap screws 28 are arranged in such a way that in the opening position (cf. FIG. 3) as well as in the closing position (cf. FIG. 5) the pivotable bars 15 are not directed precisely radially outwards, but said pivotable bars migrate through the radial direction on their way from the opening position to the closing position. This intermediate position is shown in FIG. 4. In this intermediate position, the outer ends 23 of the pivotable bars 15 are radially most distant from the centre of the flange plate 10. The outer ends 23 urge—in this intermediate position—the lower star-shaped ring 6, which consists of a viscoelastic plastic material, slightly outwards in the radial direction so that a dead centre has to be overcome in the intermediate position. In this way, a sort of bistable toggel catch is obtained by means of the pivotable bars, said pivotable bars 15 being unable to loosen themselves automatically from their closing position (cf. FIG. 5).

In order to facilitate the operation of the pivotable bars 15, a handle 29 is attached to the rotatable disc such that it is secured against rotation relative thereto.

In the following, the function and the mode of operation of the first embodiment will be explained in detail.

When the star-shaped collar 3 is to be replaced by another star-shaped collar, since larger vessels, for example, are to be treated on the vessel treatment machine, the star-shaped collar 3 is first unlocked. Taking as a basis the closing position shown in FIG. 5, the handle 29 is therefore rotated clockwise. In the course of this operation, the pivotable bars 15 pass the intermediate position (cf. FIG. 4) and press against the lower star-shaped ring 6, and, consequently, a certain resistance will be noticed when the handle 29 is being rotated. When this resistance has been overcome, the rotatable disc 25 can be rotated comparatively easily until the pivotable bars 15 knock against the cap screws 28. The pivotable bars are now located in the opening position (cf. FIG. 3). In this position, the star-shaped collar 3 can be taken off upwards and removed.

For the purpose of installing a new star-shaped collar 3, said star-shaped collar is first placed on the flange plate 10 from above in such a way that the driving lugs 19 and 20 and the respective driving recesses 17 and 18 in the flange plate 10 coincide with one another. Due to slight back-and-forth pushing, the outer rim 13 of the flange plate 10 will slip into the recess 21, which has the shape of an annular groove and which is provided on the underside of the lower star-shaped ring 6. The locking of the star-shaped collar 3 is effected in reverse order, in comparison with the unlocking operation, i.e. the handle 29 is now rotated anti-clockwise until—after having overcome the dead centre in the intermediate position (cf. FIG. 4)—the pivotable bars abut on the other side of the cap screws 28 and are located in the closing position. The outer ends 23 now extend from above over the inner rim 14 of the lower star-shaped ring 6. Due to the different sizes of the driving lugs 19 and 20, the star-shaped collar is, in this position, clearly fixed in the direction of rotation of the transport star 2. The actual fastening against removal is effected by means of the pivotable bars 15.

In view of the fact that, in the case of the embodiment shown in these figures, the upper side of the inwardly directed rim of the lower star-shaped ring 6 extends circumferentially, it is also possible that pockets are respectively formed only in the area of the outer ends 23 of the pivotable bars 15; these pockets can then be engaged by the outer ends 23 of the pivotable bars 15.

When the rotational angle position of the star-shaped collar is to be corrected, this can be done easily by rotating the flange plate 10 relative to the flange 11 with the aid of the elongate holes 16 in said flange 11.

In the following, an additional embodiment of the invention will be explained in detail on the basis of FIG. 6 and 7.

Figure 6:
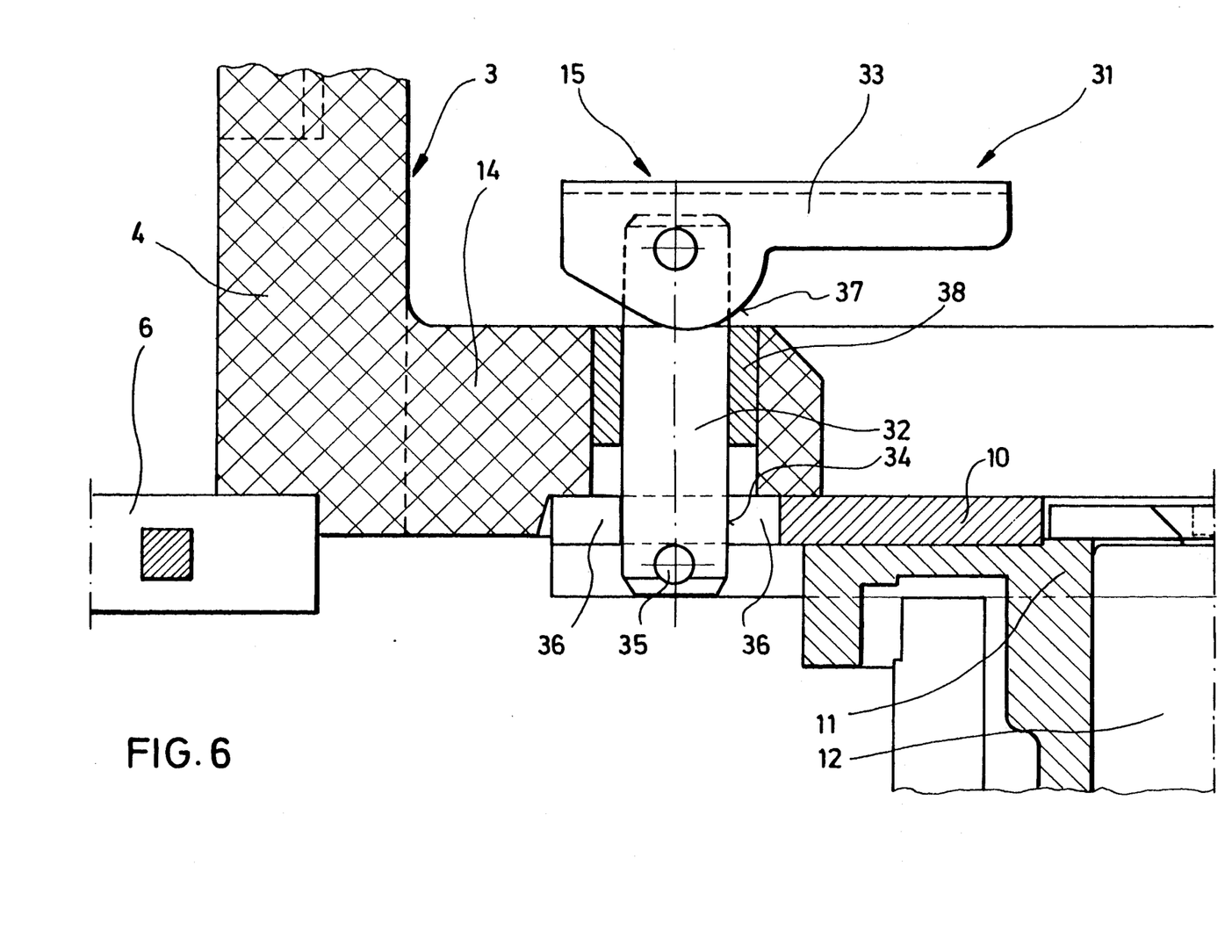
FIG. 6 shows in a sectional view similar to that of FIG. 2 the marginal portion between the flange plate and the star-shaped collar with a second variant of a quick-locking bar.
Figure 7:
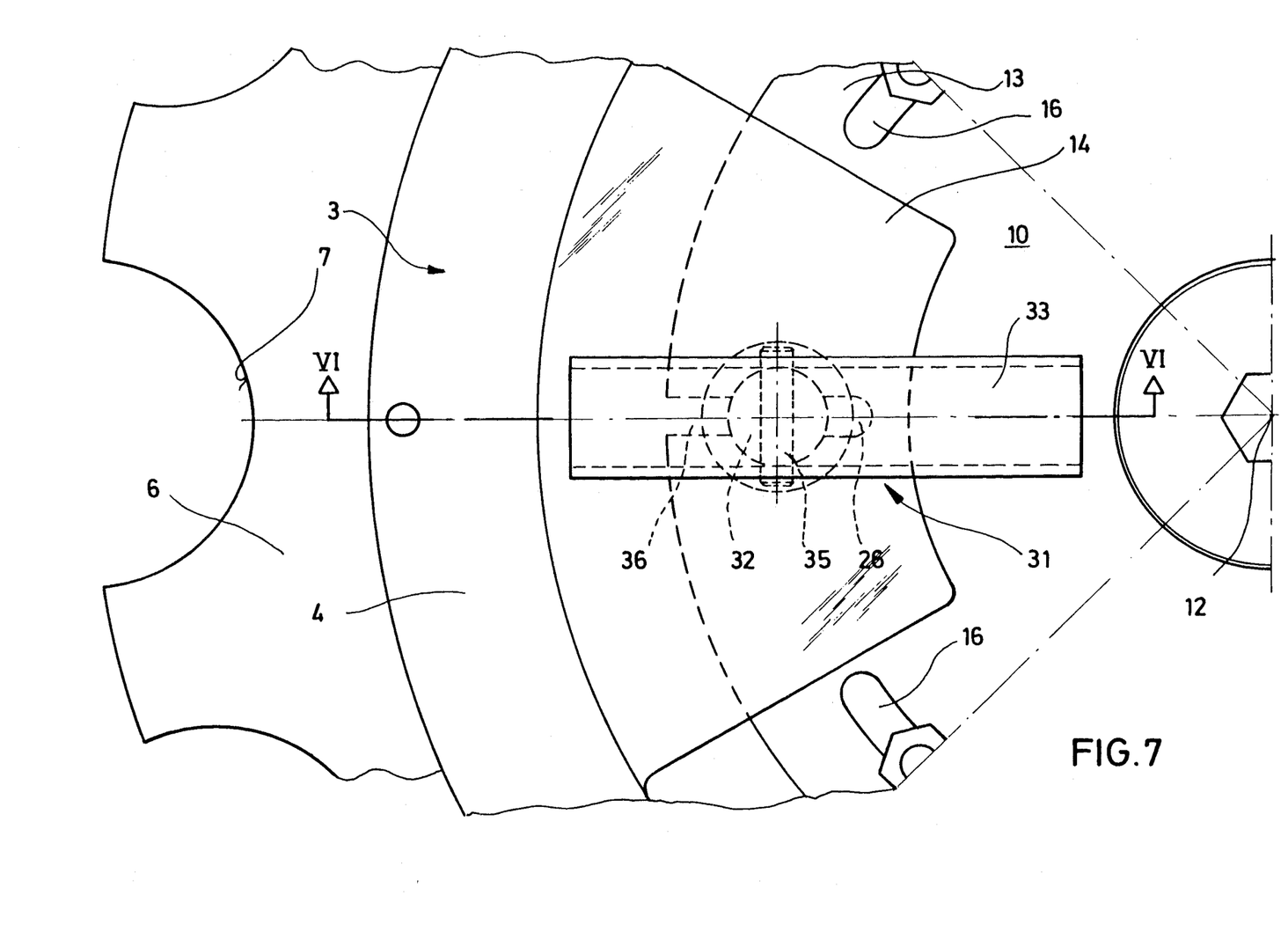
FIG. 7 shows a top view of the quick-locking bar according to FIG. 6.

The fundamental construction of the transport star 2, only part of which is shown in FIG. 6 and 7, corresponds to that of the embodiment described hereinbefore. Hence, identical reference numerals will be used for identical and similar structural components. In the following, only the differences and the particularities of the second embodiment will be explained.

The quick-locking bars 15 are attached to the inwardly directed rim 14 of the star-shaped collar 3. Said quick-locking bars are eccentric locking means 31 provided with a clamping bolt 32, which is rotatably and displaceably guided in said rim 14 and at the upper end of which a rocking lever 33 is pivotably supported.

The clamping bolt 32 extends through a hole 34 in the flange plate 10 and its lower end is provided with a stop pin 35 extending transversely to the longitudinal axis of said clamping bolt. The flange plate 10 has formed therein slots 36, which are located adjacent the hole 34 and through which the stop pin 35 together with the clamping bolt 32 can be passed through the flange plate 10 from above. For this purpose, the clamping bolt 32 will have to be rotatably displaced by 90° relative to the representation shown in FIG. 6.

The underside of the rocking lever 33 is provided with an eccentric cam 37, which presses from above onto the upper side of the inwardly directed rim 14 of the star-shaped collar 3 when the rocking lever is located in the clamping position shown in FIG. 6. In this position, the stop pin 35 extends transversely to the slots 36 and rests on the underside of the flange plate 10. From FIG. 6 it is easily evident that the star-shaped collar 3 is provided with a tubular hub 4 and that the inner rim 14 is formed on said hub 4.

In FIG. 7 a top view of the eccentric locking means 31 is shown. The position of the stop pin 35 transversely to the slots 36 can be seen well in this top view.

Furthermore, this top view shows well that the inwardly directed rim 14 of the star-shaped collar 3 need not be formed such that it extends circumferentially. On the contrary, it will be sufficient when respective marginal segments whose shape resembles that of a piece of a round cake are formed, the eccentric locking means 31 being inserted in said marginal segments.

Finally, it should be mentioned that the clamping bolt 32 is guided in the inwardly directed rim 14 by means of a guide bushing 38, which can be formed as a cast-in component e.g. during the production of the inwardly directed rim 14 of the star-shaped collar 3. Said guide bushing 38 also prevents the eccentric locking means 31 from being removed completely. The distance between the lower edge of the guide bushing 38 and the lower edge of the inner rim 14 corresponds at least to the diameter of the stop pin 35.

In the following, the function and the mode of operation of the transport star 2 according to the second embodiment will be explained in detail.

Taking as a basis the fastening position of the star-shaped collar 3, which is shown in FIG. 6 and 7, the exchange of the star-shaped collar 3 is described. For this purpose, the rocking levers 33 of the eccentric locking means 31—a total number of four such eccentric locking means being preferably arranged on the circumference of the star-shaped collar 3—are first pivoted upwards so that the eccentric cam 37 is detached from the upper side of the inwardly directed rim 14. The clamping bolt 32 is now located, with a certain amount of play, between the flange plate 10 and the inwardly directed rim 14 of the star-shaped collar 3. This certain amount of play permits the clamping bolt to be rotated by 90° relative to the position shown in FIG. 7. The slots 36 are then in alignment with the stop pin 35. It follows that, when the clamping bolts 32 are lifted, the stop pin 35 could pass through the slots. When all eccentric locking means 31 are located in this position, the star-shaped collar 3 can be removed.

The new star-shaped collar 3 provided for the purpose of exchange is attached from above and is moved slightly back and forth so that the outer rim of the flange plate 10 will enter the recess 21, which has the shape of an annular groove and which is provided on the underside of the inwardly directed rim 14 of the star-shaped collar 3. In this position, the star-shaped rim 3 is already centred. The underside of the inwardly directed rim 14 already rests on the upper side of the flange plate 10, since between the lower edge of the guide bushing 38 and the upper edge of the flange plate 10 there is enough space for accommodating the lower end of the clamping bolt 32 with its stop pin 35. Due to a slight rotational displacement of the star-shaped collar 3 relative to the flange plate 10, the clamping bolts are brought into alignment with the associated holes 34 so that the clamping bolts 32 engage said holes with their lower ends. The eccentric locking means 31 are now pressed downwards or they drop simply due to their gravitational force until the associated stop pins 35 have passed through the slots 36. The rocking lever 33 of an eccentric locking means 31 is directed upwards at an oblique angle in this position. The eccentric locking means 31 are now rotated such that the rocking levers are directed essentially radially inwards. This has the effect that the associated stop pin 35 is positioned transversely to the slots 36. Subsequently, the rocking levers of the respective eccentric locking means 31 are pressed downwards so that the eccentric cam 37 will rest on the upper side of the inwardly directed rim 14 of the star-shaped collar 3 and so that the eccentric locking means 31 will clampingly fasten the inwardly directed rim 14 and the flange plate 10 relative to one another. The new star-shaped collar 3 is fixed.

A noteworthy fact in the case of both embodiments is that a simple exchange of the star-shaped collars is possible even in cases in which the star-shaped collar has a certain height. The star-shaped collar 3 is connected to the flange plate by means of a very small number of manipulations.

In order to enhance the outward appearance, it is also possible to place, from above, a cover loosely onto the star-shaped collar 3.

Although the advantages of the present invention will primarily be noticeable in the case of star-shaped collars having a certain height, the fastening mode according to the present invention can also be applied in the case of transport stars having a star-shaped collar which comprises only one star-shaped ring.

I claim:

1. A vessel treatment machine comprising a machine frame and a transport star, which is arranged on said machine frame such that it is adapted to be driven and which includes a star-shaped collar consisting of several outer star-shaped rings, which are arranged one on top of the other, and an inner flange plate, which is concentric with said star-shaped collar and which is located on the level of the lower star-shaped ring, the star-shaped collar being adapted to be secured to said flange plate via an inwardly directed rim and said flange plate being connected to a drive shaft, characterized in that the flange plate (10) is fixedly connected to the drive shaft (12) and that the outer rim (13) of the flange plate (10) has attached thereto quick-locking bars (15) which hold the inner rim (14) of the star-shaped collar (3).

2. A vessel treatment machine according to claim 1, characterized in that the inwardly directed rim (14) of the star-shaped collar (3) is formed on the lower star-shaped ring (6).

3. A vessel treatment machine according to claim 1, characterized in that the star-shaped rings (5, 6) are secured to a tubular hub (4) and that the inner rim (14) of the star-shaped collar (3) is formed on the hub (4).

4. A vessel treatment machine according to claim 1, characterized in that the quick-locking bars (15) are constructed as eccentric bars (31), which extend through the inner rim (14) of the star-shaped collar (3) and through the outer rim (13) of the flange plate (10) and in the case of which a bolt (32) engages, from below, behind one (13) of the two rims and an eccentric cam (37) presses, from above, on the other (14) of the two rims, said eccentric cam (37) being pivotably supported on said bolt (32).

5. A vessel treatment machine according to claim 1, characterized in that a circumferentially extending centering recess (21) is formed in the inner rim (14) of the star-shaped collar (3) on the underside thereof, the outer rim (13) of the flange plate (10) engaging said centering recess.

6. A vessel treatment machine according to claim 1, characterized in that the outer rim (13) of the flange plate (10) is provided with radial driving recesses (17, 18) which are engaged by radially inwards directed driving lugs (19, 20) of the star-shaped collar (3).

7. A vessel treatment machine according to claim 1, characterized in that one of the driving lugs (20) and an associated driving recess (18) are larger or smaller than the remaining driving lugs (19) and driving recesses (17).

8. A vessel treatment machine according to claim 1, characterized in that the star-shaped rings (5, 6) consist of a viscoelastic plastic material.

9. A vessel treatment machine according to claim 1, characterized in that each of the star-shaped rings (5, 6) has embedded therein a metallic reinforcing ring (8).

10. A vessel treatment machine according to claim 1, characterized in that the quick-locking bars (15) are constructed as pivotable bars whose outer ends (23) are located radially within the outer rim (13) of the flange plate (10) in the opening position and extend over the inner rim (14) of the star-shaped collar (3) in the closing position.

11. A vessel treatment machine according to claim 1, characterized in that, in an intermediate position, the outer ends (23) of the pivotable bars (15) press radially against the lower, elastic-yielding star-shaped ring (6).

12. A vessel treatment machine according to claim 1, characterized in that the individual pivotable bars (15) have their inner ends (24) pivotably articulated on a rotatable disc (25) after the fashion of a crank mechanism, said disc (25) being rotatably supported on the flange plate (10) such that it is concentric therewith, and said individual pivotable bars (15) being supported in slide guide means (26, 27) between their respective inner ends (24) and outer ends (23).

13. A vessel treatment machine according to claim 1, characterized in that the flange plate (10) has provided thereon at least one stop means (28) limiting the angle of rotational displacement of the rotatable disc (25), said stop means (28) being arranged at the side of the rotatable disc (25) when seen in the radial direction.

14. A vessel treatment machine according to claim 1, characterized in that the stop means (28) are constructed as at least two oppositely disposed cap screws, which are screwed into the flange plate and which extend over the rotatable disc (25) from above.

15. A vessel treatment machine according to claim 1, characterized in that an elongate hole (26), which extends in the longitudinal direction of the pivotable bars, is provided as a slide guide means for said pivotable bars, a guide pin (27), which is inserted in the flange plate (10), extending through said elongate hole (26).

16. A vessel treatment machine according to claim 1, characterized in that a handle (29) is attached to the upper side of the rotatable disc (25) such that it is secured against rotation relative thereto.

17. A vessel treatment machine according to claim 1, characterized in that four quick-locking bars (15) are arranged such that they are uniformly distributed in the circumferential direction of the flange plate (10).

18. A vessel treatment machine according to claim 1, characterized in that the flange plate (10) has formed therein openings (22) through which broken pieces of glass can fall.

19. A vessel treatment machine according to claim 1, characterized in that each of said openings (22) extends approximately between two neighbouring pivotable bars (15) and from the outer rim (13) of the flange plate up to the rotatable disc (25).

* * * * *